Oct. 11, 1955
C. W. BRANDON
2,720,182
TANK BARGE ASSEMBLY
Original Filed Feb. 4, 1949
3 Sheets—Sheet 1
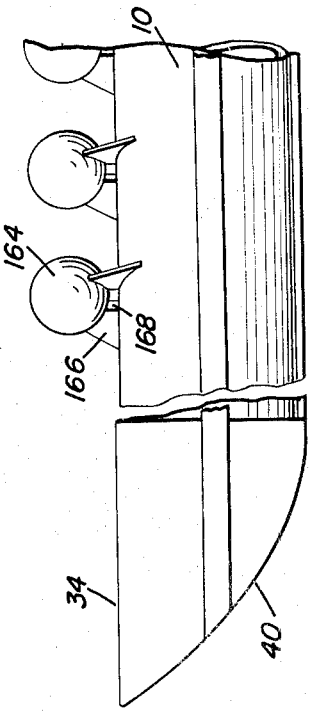
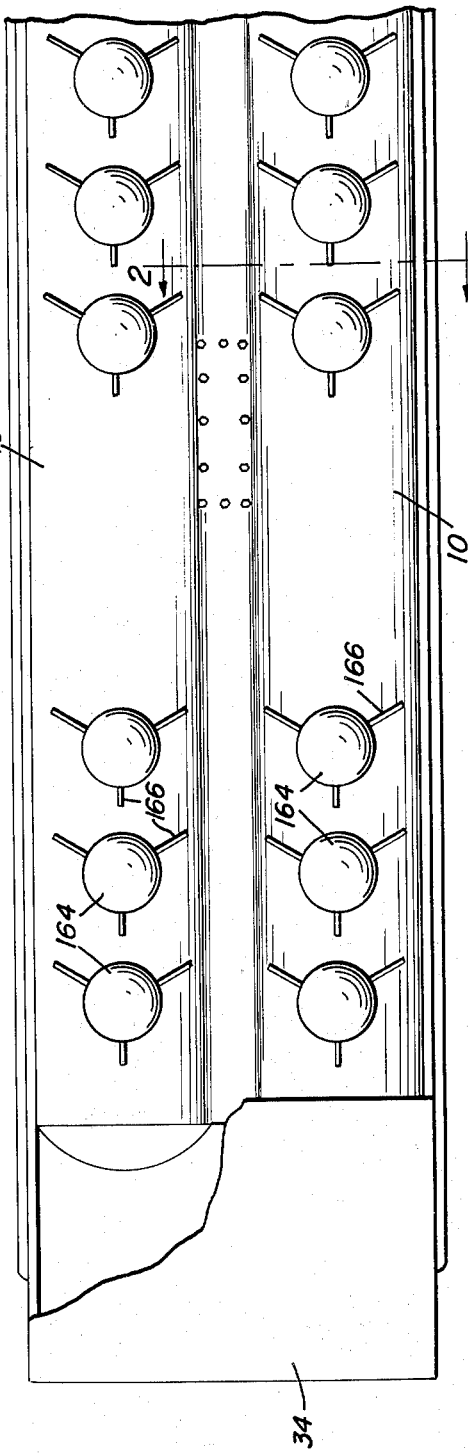
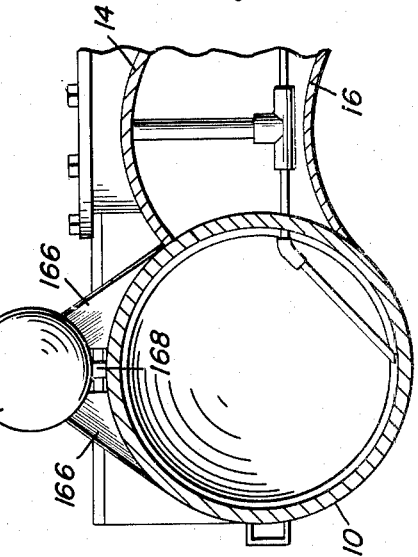
Clarence W. Brandon
INVENTOR.

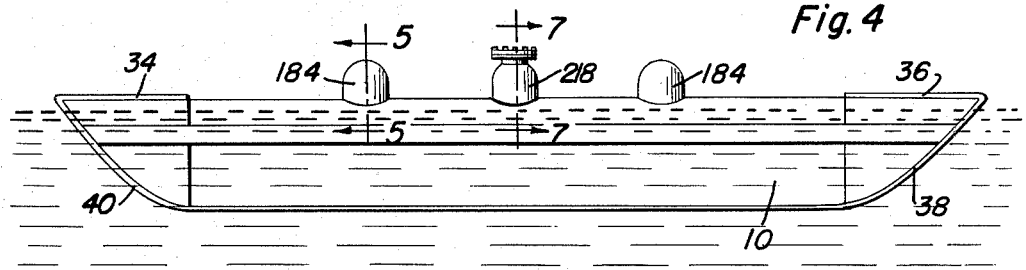
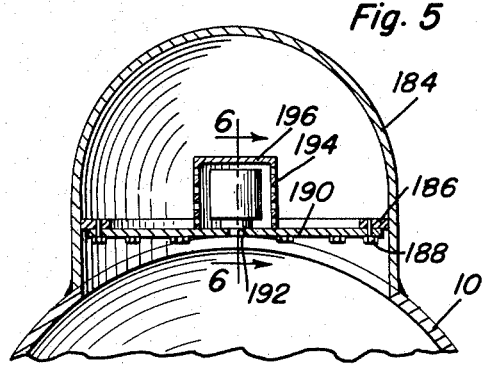
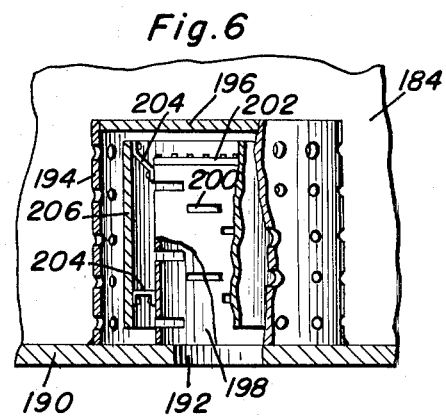
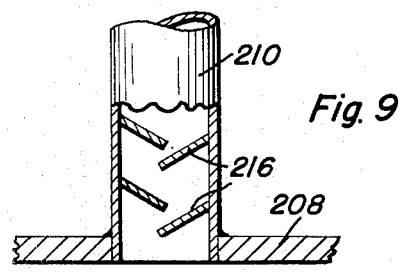
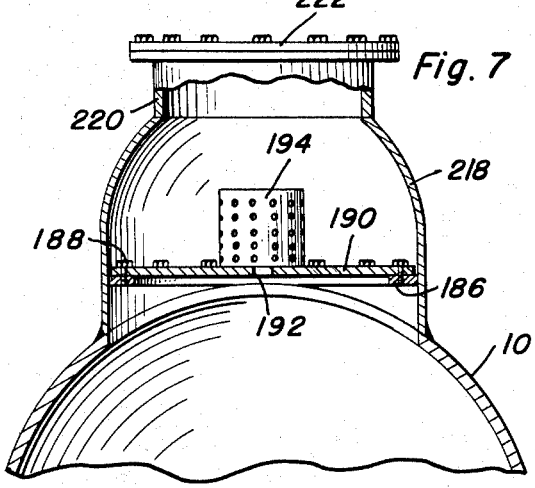
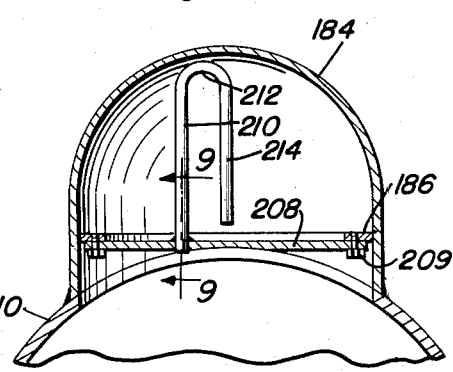
Clarence W. Brandon
INVENTOR.

Oct. 11, 1955 C. W. BRANDON 2,720,182
TANK BARGE ASSEMBLY
Original Filed Feb. 4, 1949 3 Sheets-Sheet 3
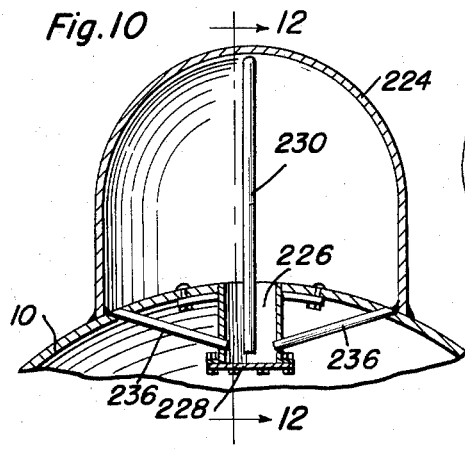
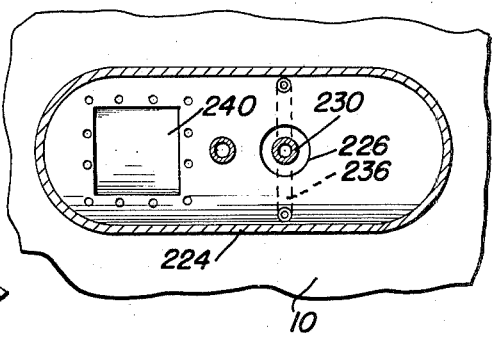
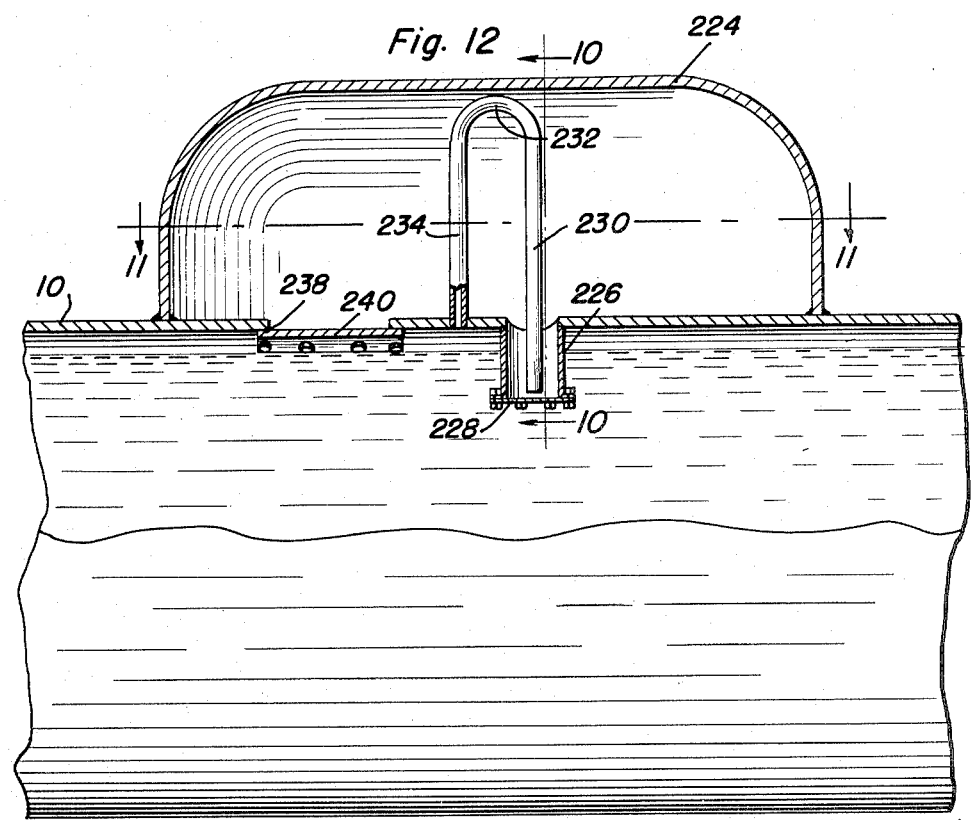
Clarence W. Brandon
INVENTOR.

United States Patent Office 2,720,182
Patented Oct. 11, 1955

2,720,182

TANK BARGE ASSEMBLY

Clarence W. Brandon, Tallahassee, Fla., assignor, by direct and mesne assignments, of forty-two and one-half per cent to N. A. Hardin, Hazel H. Wright, and Catherine H. Newton, all of Forsyth, Ga., and fifteen per cent to Harvey B. Jacobson, Washington, D. C.

Original application February 4, 1949, Serial No. 74,546. Divided and this application May 28, 1951, Serial No. 228,654

22 Claims. (Cl. 114—74)

This invention comprises novel and useful improvements in a multiple unit barge, and in general comprehends apparatuses and methods for the storage, cooling and transportation of volatile liquids and other fluids. More specifically, it consists of a barge comprising a plurality of spaced, liquid containing tanks, which are rigidly attached together to form a seaworthy vessel.

This application is a division of my prior application, Serial No. 74,546, filed February 4, 1949, for Multiple Unit Barge, which prior application itself is similar in subject matter to that set forth in the prior patent of Clarence W. Brandon and George M. Brandon, No. 2,408,505, and my copending application, Serial No. 39,154, filed July 16, 1948, and now Patent No. 2,689,461, issued September 21, 1954; and it further includes improvements over said prior patent and copending applications.

The industry of storing and transporting liquefied volatile fluids has long recognized that the basic difficulties to be overcome arise from the necessity of maintaining the confined volatile fluids at a sufficiently low temperature to prevent their absorption of heat and concomitant temperature and pressure rises, with the mechanical problems associated therewith.

Moreover, in that branch of the industry concerned with marine transportation of such fluids, it has been well known that shallow draft barges are necessary for use on coastal and inland waterways; but that the necessity for shallow draft in conjunction with the preceding difficulties has heretofore prevented the construction of seaworthy barges.

Still further, in coastal shipping particularly, the above difficulties are accompanied and augmented by the problem of maintaining the barge in trim while loading or unloading portions of its contents.

It is, therefore, the primary object of this invention to provide an improved barge and an improved method for transporting, storing and/or refrigerating volatile liquids, such as propane, butane, ammonia, and the like.

A very important object of this invention is to effectively unite a plurality of separate fluid storage tanks in rigid, spaced assembly with respect to each other, to form in their entirety a durable and seaworthy barge.

An additional important object is to provide a barge of the character set forth in the preceding paragraph, which shall be of shallow draft, yet having maximum stability when loading or unloading as well as when in operation.

A further object of the invention is to provide a barge wherein the necessary space between adjacent tank units may be employed to advantage for a variety of purposes such as the housing of controls and pipes, the mounting of machinery therein, the obtaining of access to the sides of the tanks, to provide additional buoyancy, if desired, to admit water to all sides of the tanks for increased cooling of their contents, if desired, and to accommodate a strengthening and reinforcing structure for uniting the tank units.

And a final important object to be specifically enumerated herein is to provide a barge for transporting, storing and/or refrigerating volatile liquids and the like which shall have a maximum of structural strength and rigidity, a minimum of weight and be of a compact, simple and durable construction.

An important feature of the invention resides in providing a barge having a plurality of liquid containing tanks which are rigidly connected in spaced, side-by-side relation by upper and lower partition plates which form an elongated chamber therebetween, useful for a variety of purposes; or by a system of rigid struts and braces.

A still further feature of the invention includes the addition of buoyancy chambers to various portions of the tanks in conjunction with the above-mentioned deck and fender constructions.

Another feature of the invention resides in the provision of separate vapor chambers mounted in the stem and/or stern structure of the barge and connected with the liquid storage compartments of the tanks for providing an expansion space therefor, for promoting a refrigerating action by circulation of fluid between the tank and vapor space.

A further feature of the invention includes improved baffle and splash plate constructions for preventing splashing of the contents of the barge, lessening surging of the liquid contents with a resultant influence upon the center of gravity of the barge.

These, together with various ancillary features and objects of the invention which will later become apparent as the following description proceeds, are attained in the manner and by the arrangements to be hereinafter described, and of which the accompanying drawings are to be regarded as illustrative of the principles of the invention only, and wherein:

Figure 1 is a top plan view, parts being broken away, of an embodiment of barge, incorporating therein the principles of this invention;

Figure 2 is a transverse, vertical sectional detail view, taken substantially upon the plane of the section line 2—2 of Figure 1;

Figure 3 is a fragmentary side elevational view, parts being broken away, of the arrangement of Figure 1;

Figure 4 is a side elevational view of an alternative barge construction having a modified expansion chamber construction thereon;

Figure 5 is a fragmentary vertical transverse sectional detail view through one of the expansion chambers, the same being taken substantially upon the plane indicated by the section line 5—5 of Figure 4;

Figure 6 is a fragmentary detail view, upon an enlarged scale, taken substantially upon the plane indicated by the section line 6—6 of Figure 5;

Figure 7 is a vertical transverse sectional view, taken substantially upon the plane of the section line 7—7 of Figure 4 and illustrating a further structural detail of the barge in Figure 4;

Figure 8 is a vertical sectional detail view similar to Figure 5 but of a modified overflow arrangement of the expansion tank construction;

Figure 9 is a vertical longitudinal sectional view upon an enlarged scale of a baffle construction employed in a conduit and is taken substantially upon the plane indicated by the section line 9—9 of Figure 8;

Figure 10 is a view similar to Figure 5 but of a still further modified construction of an elongated expansion chamber; taken substantially upon the plane indicated by the section line 10—10 of Figure 12;

Figure 11 is a horizontal sectional detail view taken substantially upon the plane indicated by the section line 11—11 of Figure 12; and Figure 12 is a vertical longitudinal sectional view through the expansion chamber of Figure 10, taken substantially upon the plane indicated by the section line 12—12 therein.

Reference is now made more specifically to the accompanying drawings, wherein like numerals designate similar parts throughout the various views, and wherein the same numerals are employed in the present case as are referred to in my prior application, Serial No. 74,546.

Multiple unit barge construction

A fundamental principle of this invention is to employ the storage tanks of the volatile liquid as units of and as major components of the hull of a barge, thus reducing the amount of material and the weight of the barge to an absolute minimum. The invention as set forth in the present application is primarily concerned with rigidly securing a plurality of such tank units into a barge assembly having the important desideratum of rigidity, strength, shallow draft, and stability. Various embodiments and arrangements and varying numbers of tanks may be employed, but it is felt that the principles of the invention may be best attained by combining two or more such tanks in spaced side-by-side relationship and rigidly connecting the same together in varying manners including particularly across their ends, as set forth hereinafter. For purposes of simplicity in illustration, the invention has been illustrated throughout the drawings as being applied to barges having a pair of tanks. Obviously, the principles of the invention are not so limited, and it will be understood that all are applicable to barges with three or more tanks while some are capable of use with barges having but a single tank.

The barge illustrated in the accompanying drawings comprises a pair of elongated, preferably cylindrical tanks 10, which may be of any desired material, shape and construction in accordance with the performance required of these tanks, and which are secured in parallel, spaced, side-by-side relation and are rigidly connected together as by upper and lower curved or, if desired, flat, longitudinally extending partition members 14 and 16 which may be welded or otherwise rigidly attached to the tanks 10 at their bottom surfaces or between their sides in any suitable places, and which thus define an elongated chamber extending substantially the length of the tanks. In some instances, it may be deemed preferable to omit all or portions of these partition members to permit water to freely enter the spaces between the tanks, and in these instances the tanks will be rigidly united by any suitable truss or brace construction.

The barge in accordance with the present application further includes, as set forth in detail in my above referred to copending applications, prow and stern assemblies including respectively deck portions 34 and 36, and downwardly sloping plates 40 and 38 respectively. The prow and stern assemblies may be separately formed and will, of course, be provided with the requisite bracing and structural elements, and are preferably rigidly attached to and directly mounted upon the ends of the tanks 10 to thereby adapt these tanks for use as a navigable barge.

In the storing and handling of such volatile liquids as propane, butane, ammonia, and the like, it is necessary that the liquid shall be stored under a predetermined maximum pressure and maintained below a predetermined minimum temperature in order that the liquid may be maintained substantially in its liquid condition. When liquids of this character absorb heat, as from the sun's rays, their surroundings, or the like, the confined liquids are subjected to a very great pressure increase and, further, the resulting increase in temperature causes vaporization of some of the liquid, further augmenting the pressure to which the containers are subjected. Consequently, it is necessary in handling liquid cargoes of this nature that provision shall be made for the heated liquids to expand in bulk and also to partially vaporize. Yet, it is also desirable that there shall be substantially no loss of the liquid or its vapors during this period of expansion occasioned by the inflow of heat and temperature rises.

In the present application there are disclosed a plurality of constructions providing expansion chambers whereby the increase in volume of the liquid cargo may be accommodated, and the systems disclosed include expansion chambers directly associated with each of the tanks 10, whereby liquid may overflow from the tanks 10 under the above-mentioned increase in temperature and pressure, into the expansion chamber; and may thereafter be returned to the tanks 10 upon a drop in their pressure or temperature.

Referring first to the form of the invention shown in Figures 1–3, it will be seen that each of the tank units 10 is surmounted by a plurality of expansion chambers 164. Each of these chambers is supported above or between the tank units 10 and preferably upon the vertical central longitudinal plane thereof, and in order to obtain the maximum volume, together with the minimum amount of material and with the greatest strength, these expansion chambers may conveniently be of spherical shape. It is preferred to support these chambers upon the upper surface of the tanks 10 by means of vertical webs or brackets 166, three such brackets being provided for each expansion sphere, the brackets being welded, riveted or otherwise rigidly secured to the expansion spheres and to the tank 10.

As shown in Figures 2 and 3, a conduit 168 may be disposed between the most adjacent portions of the spherical chambers 164 and the tanks 10 for establishing a restricted but always open communication therebetween.

By this arrangement, the expansion of the contents of the tank 10, under the influence of heat, will result in an overflow of part of the contents thereof into the expansion chamber or chambers 164, thereby preventing a dangerous rise in pressure in the storage tank 10.

It will be noted that the expansion chamber or chambers 164 will thus serve as vapor collection chambers above the volatile liquid contents of the tank 10, and will further serve as compression chambers within which the excess fluid of the expanding volatile liquid may be stored.

It is to be understood that the number and position of the expansion chambers 164 may be varied to suit particular needs of the barge, and in some instances I may employ but a single chamber for each tank 10, while in other instances I may employ any desired number positioned in any desired location on the tank 10.

In this embodiment of the invention, it is apparent that the volatile liquid stored within the tanks 10, and which it is intended shall completely fill the tanks 10 at all times during transit of the cargo by the barge, will, upon expansion of this liquid under the influx of heat, partially overflow into the various expansion chambers 164, each of which is preferably partially filled with liquid at all times. The overflowing liquid will raise the pressure in the chambers 164, thereby preventing rupturing of the tanks 10 which might occur should the latter be subjected to the expansive effects of temperature rises in confined bodies of the volatile liquid within the tanks. When the condition producing the temperature rise has disappeared, and the temperature within the tanks 10 drops, the increased pressure within the chambers 164 will return the overflow back to the tanks 10, thereby maintaining the latter full of liquid at all times.

It should be noted that the longitudinal spacing of the chambers 164 along the length of the tanks will prevent excessive movement of the liquid within the tanks from one end to the other, since the overflow will be drawn off at a plurality of points along the length of the tank. Thus, the tanks 10 will be maintained full of liquid at all times tending to prevent unwanted changes in the trim of the barge.

Attention is next directed to the arrangement of Figure 4, wherein the same arrangement of barge is provided having longitudinally extending cylindrical tanks rigidly secured together with prow and stern assemblies as previously described in connection with Figure 1. However, in this arrangement, each of the tanks 10 has adjacent the end portions of the upper surface thereof an expansion element 184, which, as shown in Figure 5, is substantially hemispherical in shape. This dome is welded or otherwise attached to the tank 10 at a suitable opening therein. The interior of the dome 184 is provided with an annular flange 186 removably secured to the under surface of which, as by fastening bolts 188, is a partition or closure plate 190 provided with an aperture 192 therein. By means of this aperture, fluid is permitted to expand from the interior of the tank 10 through the partition 190 and into the expansion dome 184. Obviously, any desired number and arrangement of expansion chambers may be employed.

To prevent surging or splashing of the fluid into the dome, as when the barge encounters heavy seas, the baffle construction, as set forth in Figure 6 or the modified baffled conduit of Figures 8 and 9, preferably consists of a foraminous or apertured cylinder 194 provided with a closed top wall 196 welded or otherwise secured to the partition 190 surrounding the aperture 192.

Positioned within the foraminous sleeve 194 is an innermost cylindrical baffle 198 which is provided with suitably positioned slots 200 in the wall thereof, and with a closed top 202, as shown in Figure 5. Mounted and supported upon the inner sleeve 198, as by suitable brackets 204, is an intermediate sleeve 206 of imperforate construction which is spaced from the top closure 196 of the foraminous sleeve 194 and from the partition 190. This intermediate sleeve prevents direct communication between the slots 200 and the apertures of the foraminous sleeve 194. Thus, fluid passing through the aperture 192 into the baffle construction is prevented from passing from the upper end thereof by means of the top wall 202, and is therefore forced through the slots 200 in the side thereof. However, when this fluid passes through these slots, it encounters the surrounding intermediate sleeve 206 and is thus forced to pass beneath the lower edge or above the upper edge of this intermediate sleeve before the fluid is able to penetrate the apertures in the foraminous sleeve 194. Thus, splashing or surging is effectively prevented from entering the expansion chamber 184, but substantially free communication is established upon an overflow of the expanding fluid in the tank 10 into the expansion chamber.

It is to be here noted that the entire baffle construction, including the partition plate 190, may be removed from the expansion chamber 184 by merely removing the fastening bolts 188 and drawing the entire unit down into the tank 10 from beneath the annular flange 186.

An alternative baffling structure for the expansion chamber 184 is disclosed in Figures 8 and 9, wherein the partition plate, indicated at 208, and secured as by fastening bolts 209 to the under surface of the annular flange 186, is apertured to receive the lower leg 210 of a gooseneck pipe having its curved or bight portion 212 disposed adjacent the highest point of the chamber 184, and its shorter leg 214 terminating in close relation to the partition 208. As shown in the detail view of Figure 9, the lower leg 210 and also the pipe 168 of Figures 1-3, and the pipe 234 of Figures 10-12, may be provided with a series of downwardly inclined baffles 216 to prevent splashing or surging of the liquid within the tank 10 into the chamber of the expansion tank 184.

Access is obtained to the interior of the tank 10 through one of the expansion chambers such as that indicated at 218, which has a hemispherical portion surmounted by an annular sleeve 220 provided with a removable hatch or closure plate 222. In this expansion dome, as shown in Figure 7, the annular flange 186 has the partition or closure plate 190 mounted upon the upper side thereof by the removable bolts 188, so that this plate 190 and the baffle 194 secured thereto, and which may be identical with either of the above described baffles of Figures 5, 6, 8 and 9, may be released from the upper side to uncover the manhole so that access may be obtained to the interior of the tank 10 therethrough.

Thus, access may be obtained to the interior of the tank 10 and from the latter any of the partition plates 190 of the chambers 184 may be drawn downwardly from the same.

It will be apparent that any of the detachable baffle constructions of Figures 5-9 may be employed as a supplement or as a substitute for the various overflow connections between the storage and expansion chambers disclosed herein.

Referring now to Figures 10 through 12, a modified construction of expansion chamber is illustrated which comprises an elongated spheroidal housing or dome 224 of any suitable dimensions, which, at its lower edge, is welded or otherwise rigidly secured to the topmost portion of the tank 10. Within the dome 224, and preferably at the highest portion of the wall of the tank 10, there is provided a sleeve 226 which, with a closure plate 228 on the lower end thereof, forms a sump which is received within the tank 10 but communicates with the chamber 224. The lower leg 230 of a gooseneck pipe having a curved portion 232 disposed adjacent the uppermost part of the dome 224, and having a further leg portion 234 which is rigidly secured to the upper part of the tank 10 and, as shown in Figure 12, extends therethrough into free communication with the interior of the tank. From the lower part of the chamber in the sleeve 226 extend return conduits 236 which likewise extend through the tank 10 adjacent the inner circumference of the dome 224, as shown in Figure 10. The ends of the conduits 236 thus extend into what may be termed collection troughs whereby the conduits 236 drain the same into the bottom of the sump 226.

Also within the dome 224, the tank 10 is provided with a manhole opening 238 which is closed by a closure plate 240 removable from the interior of the tank 10, whereby access may be had to the interior of the dome 224 for inspection and servicing of the same.

This arrangement is such that when the fluid contents of the tank 10 are expanded, they may pass upwardly through the leg portion 234 and be discharged from the lower end of the leg 230 into the sump 226. After the sump 226 is filled up, further liquid accumulates to varying levels within the dome 224. When the liquid within the tank 10 has contracted, a return flow occurs through the pipe portions 230 and 234, thus returning this liquid to the tank 10. During this stage of the operation, the conduits 236 return accumulations of liquid within the lowermost gutters or collecting troughs within the dome 224 to the sump 226.

From the foregoing, it is felt that the various constructions and operations in accordance with the principles of this invention will be fully understood, and further explanation thereof is believed to be unnecessary.

However, since numerous modifications and equivalents will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A barge for transporting fluids comprising a single hull consisting of a pair of elongated fluid storage tanks in side-by-side relation, means extending between and rigidly connecting said tanks, said barge including expansion chamber means comprising a plurality of expansion tanks for each of said tanks and in communication therewith, each of said expansion tanks being domeshaped, and means for supporting said expansion tanks above and out of direct contact with the upper surface of said tanks, said last means comprising a plurality of webs each integrally secured to one of said tanks and to one of said expansion tanks.

2. The combination of claim 1 including a conduit establishing communication between said expansion tank and said tank, said conduit being disposed between said webs.

3. A barge for the transportation of fluids including a pair of elongated tanks in side-by-side relation and constituting containers for fluids, means extending between and rigidly connecting said tanks, prow and stern assemblies directly secured respectively to the front ends and the rear ends of both of said tanks, said barge including an expansion tank for each of said tanks and having communication therewith.

4. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks comprising semi-spherical domes, a partition in each dome, said partition having an aperture establishing continuous communication between said dome and said tank.

5. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks comprising semi-spherical domes, a partition in each dome, said partition having an aperture establishing continuous communication between said dome and said tank, an annular internal flange in said dome, said partition being removably secured to said flange.

6. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks comprising semi-spherical domes, a partition in each dome, said partition having an aperture establishing continuous communication between said dome and said tank, and a surge-preventing baffle assembly mounted on said partition and surrounding the aperture therein.

7. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks comprising semi-spherical domes, a partition in each dome, said partition having an aperture establishing continuous communication between said dome and said tank, an annular internal flange in said dome, said partition being removably secured to said flange, and a surge-preventing baffle assembly mounted on said partition and surrounding the aperture therein.

8. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks comprising semi-spherical domes, a partition in each dome, said partition having an aperture establishing continuous communication between said dome and said tank, and a surge-preventing baffle assembly mounted on said partition and surrounding the aperture therein, said baffle assembly comprising an inner sleeve having an open lower end seated on said partition and surrounding the aperture therein with its upper end closed, an outer sleeve enclosing said inner sleeve and having a closed upper end and an open lower end mounted on said partition and opening in the walls of both said sleeves.

9. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks comprising semi-spherical domes, a partition in each dome, said partition having an aperture establishing continuous communication between said dome and said tank, and a surge-preventing baffle assembly mounted on said partition and surrounding the aperture therein, said baffle assembly comprising an inner sleeve having an open lower end seated on said partition and surrounding the aperture therein with its upper end closed, an outer sleeve enclosing said inner sleeve and having a closed upper end and an open lower end mounted on said partition and opening in the walls of both said sleeves, and an imperforate intermediate sleeve between said inner and outer sleeves and having its extremities spaced from the partition and the closed upper end of the outer sleeve to provide fluid passages therebetween.

10. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks having an open lower end secured to the uppermost surface of a tank about an aperture therein, a sump in the upper surface of said tank within the confines of said expansion tank and a conduit having one end secured in said aperture and its other end terminating in said sump adjacent the bottom thereof.

11. A barge for transporting fluids comprising a pair of elongated tanks in side-by-side relation, means extending between and rigidly connecting said tanks, said barge including expansion chamber means communicating with the interior of a tank, said expansion chamber means comprising a plurality of expansion tanks for each of said tanks and in communication therewith, each of said expansion tanks having an open lower end secured to the uppermost surface of a tank about an aperture therein, a sump in the upper surface of said tank within the confines of said expansion tank and a conduit having one end secured in said aperture and its other end terminating in said sump adjacent the bottom thereof, and drain conduits connecting the lowermost portion of the upper surface of the tank within the expansion tank with the bottom of the sump.

12. A barge for transporting confined volatile fluids comprising a pair of elongated storage tanks each sealed from the atmosphere and disposed in side-by-side relation, means extending between and rigidly connecting said tanks, said pair of tanks comprising the hull of a barge and being adapted for immersion in the water for the lower major portion of their surfaces, a plurality of expansion chambers for each storage tank, means supporting each expansion chamber upon the top surface of a storage tank and above the water in which the barge is immersed, means establishing uninterrupted communication between each expansion chamber and the upper portion of the associated storage tank whereby overflow of the fluid cargo of the latter will be received in said expansion chamber and will be returned from the expansion chamber to its storage tank upon reduction in pressure within the latter thereby maintaining said storage tank filled with the volatile fluid.

13. A barge for transporting confined volatile fluids comprising a pair of elongated storage tanks each sealed from the atmosphere and disposed in side-by-side relation, means extending between and rigidly connecting said tanks, said pair of tanks comprising the hull of a barge and being adapted for immersion in the water for the lower major portion of their surfaces, a plurality of expansion chambers for each storage tank, said expansion chambers being positioned directly above and intermediate the ends of each storage tank and spaced longitudinally thereof, means establishing uninterrupted communication between each expansion chamber and the upper contiguous portion of one of the storage tanks whereby upon increase of pressure of the fluid cargo in the storage tank a portion of fluid cargo will flow into the expansion chamber and will return to the storage tank upon a decrease in pressure of the latter thereby maintaining the storage tank normally filled with the volatile fluid.

14. The combination of claim 13 wherein said expansion tanks are elongated longitudinally of the storage tanks.

15. The combination of claim 13 including means supporting said expansion chambers upon the top of the storage tanks and out of direct contact therewith.

16. The combination of claim 13 wherein at least one of said expansion chambers comprises a semi-spherical dome directly secured to the top wall of a storage tank whereby the top wall comprises the floor of said chamber.

17. The combination of claim 13 wherein said communicating means includes a sump in said chamber extending downwardly into the interior of the storage chamber and a pipe having one end communicating with the uppermost portion of the interior of the storage tank and its other end opening into said sump at a position below that of its first mentioned end.

18. A barge for transporting confined volatile fluids comprising a pair of elongated storage tanks each sealed from the atmosphere and disposed in side by side relation, means extending between and rigidly connecting said tanks, said pair of tanks comprising the hull of a barge and being adapted for immersion in the water for the lower major portion of their surfaces, a plurality of expansion tanks for each storage tank, means supporting each expansion tank upon the top surface of a storage tank and above the water in which the barge is immersed, means establishing uninterrupted communication between each expansion tank and the upper portion of the associated storage tank whereby overflow of the fluid cargo of the latter will be received in said expansion tank and will be returned from the expansion tank to its storage tank upon reduction in pressure within the latter, thereby maintaining said storage tank filled with the volatile fluid, said expansion tanks being spaced longitudinally of their associated storage tanks and communicating with the interior of the latter at a plurality of spaced locations.

19. A barge for transporting confined volatile fluids comprising an elongated storage tank sealed from the atmosphere and being immersed in the water for the lower major portion of its surface, an expansion tank sealed from the atmosphere and positioned upon the top surface of said storage tank and above the water in which the barge is immersed, said expansion and storage tanks having a common wall provided with a recessed portion reentrant into said storage tank and constituting a sump in said expansion tank, means establishing uninterrupted communication between said expansion tank and the upper portion of said storage tank whereby overflow of the fluid cargo of the latter will be received in said expansion tank and will be returned from the expansion tank to the storage tank upon reduction in pressure within the latter thereby maintaining said storage tank filled with the volatile fluid.

20. The combination of claim 19 wherein said means comprises a conduit having one end opening into the bottom of said sump and its other end opening into the storage tank.

21. The combination of claim 20 wherein said conduit has an intermediate portion extending into the upper portion of the expansion tank.

22. The combination of claim 21 including a drain conduit opening at one end through said common wall into said expansion tank and at its other end into said sump adjacent the bottom thereof.

References Cited in the file of this patent

UNITED STATES PATENTS

| | | |
|---|---|---|
| 57,479 | Church | Aug. 28, 1866 |
| 57,866 | Church | Sept. 11, 1866 |
| 61,213 | Knight | Jan. 15, 1867 |
| 733,583 | Harvey | July 14, 1903 |
| 1,303,690 | Leparmentier | May 13, 1919 |
| 1,712,538 | Wild | May 14, 1929 |
| 1,825,311 | Eschholz | Sept. 29, 1931 |
| 2,179,682 | Booth | Nov. 14, 1939 |
| 2,560,153 | Blount | July 10, 1951 |

FOREIGN PATENTS

| | | |
|---|---|---|
| 115,192 | Switzerland | June 1, 1926 |